(No Model.) 2 Sheets—Sheet 1.

G. H. PATTISON.
GEARING FOR WINDMILLS.

No. 351,461. Patented Oct. 26, 1886.

Witnesses
J. A. Cram
C. E. Coulter

Inventor
George H. Pattison
By his Attorneys
Wilcox & Greene (No Model.) 2 Sheets—Sheet 2.
G. H. PATTISON.
GEARING FOR WINDMILLS.
No. 351,461. Patented Oct. 26, 1886.
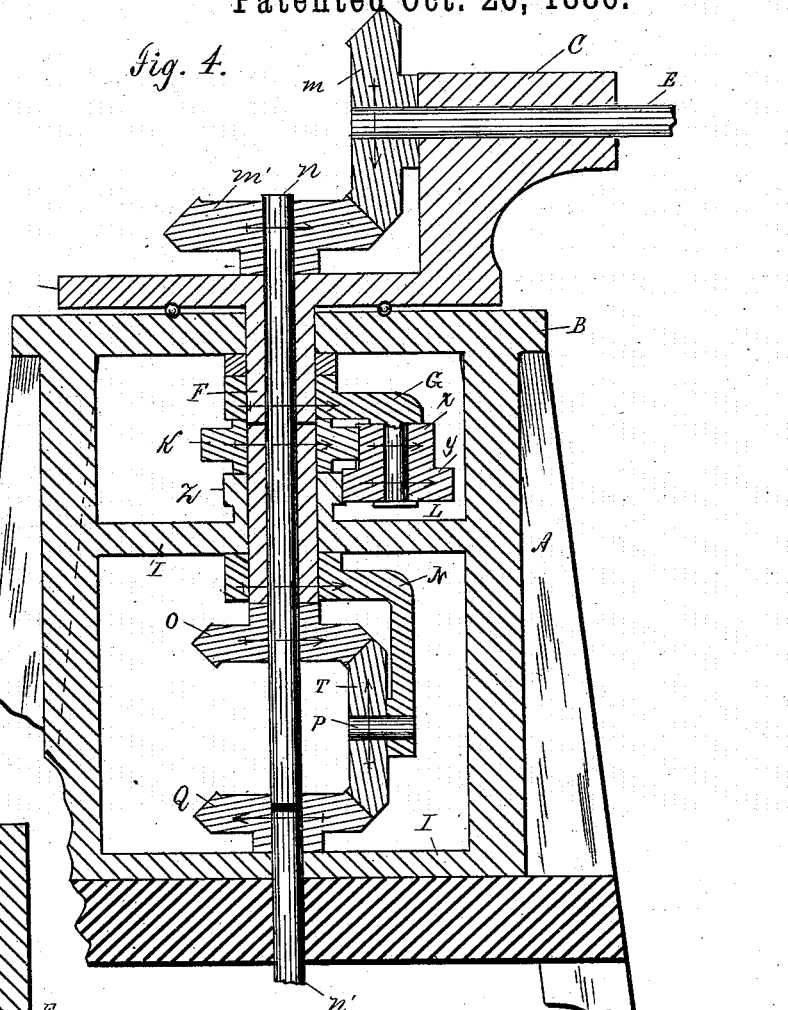
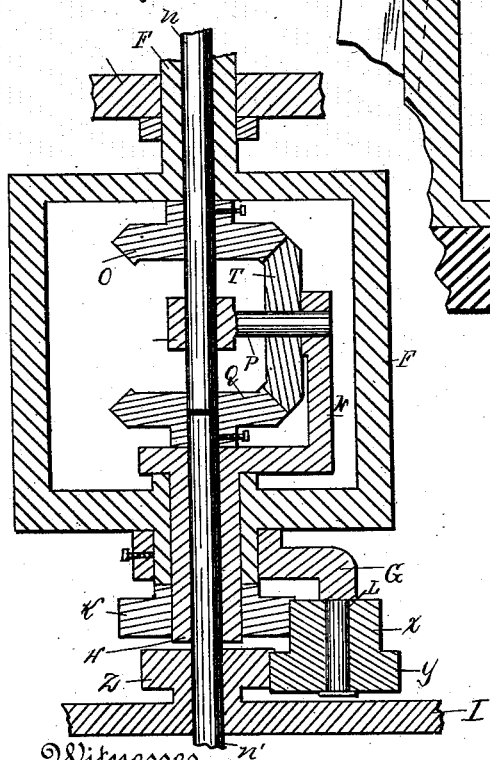
Witnesses
Inventor
George H. Pattison
By his Attorney

UNITED STATES PATENT OFFICE.

GEORGE H. PATTISON, OF FREEPORT, ILLINOIS.

GEARING FOR WINDMILLS.

SPECIFICATION forming part of Letters Patent No. 351,461, dated October 26, 1886.

Application filed August 3, 1886. Serial No. 209,897. (No model.)

*To all whom it may concern:*

Be it known that I, GEORGE H. PATTISON, a resident of Freeport, in the county of Stephenson and State of Illinois, have invented certain new and useful Improvements in Gearings for Windmills; and I do hereby declare the following to be a full, clear, and exact description of the invention, such as will enable others skilled in the art to which it pertains to make and use the same.

My invention relates to improvements in gearings for windmills, in which the object is to counteract the tendency of the work performed by the mill to throw the wind-wheel out of the wind.

The invention is fully described and explained in the following specification and shown in the accompanying drawings, in which—

Figure 1 is a central vertical section of a windmill-tower and turn-table with the gearing in operative position. Fig. 2 is a similar view of a modified form of the gearing located in the turn-table of Fig. 1. Fig. 3 is a view of a modified form of the lower part of the gearing of Fig. 1. Fig. 4 is a similar view of a modified form of the invention, in which most of the gearing is located below the turn-table. Fig. 5 shows the gearing O T Q located lower down in the turn-table than in Fig. 1.

In Fig. 1, A are the posts of an ordinary windmill-tower. B is a top plate fastened to said posts, and C is a turn-table supported by anti-friction balls, which rest on the plate B. The lower portion of the turn-table is a hollow cylindrical neck, F, extending through the plate B, and a horizontal bearing, D, is formed integrally with the turn-table and provides a bearing for the wind-wheel shaft E, while a vertical arm, D', is also formed integrally with the turn-table, and provides a bearing for the short, preferably hollow, shaft $n$, upon which are mounted the miter-gears $m'$ O, the gear $m'$ engaging with the gear $m$ on the wind-wheel shaft E.

The hollow shaft H is journaled in the turn-table, and to its upper end is attached the arm or bracket N, bearing the gudgeon P, upon which is journaled the miter planet-gear T. The planet-gear T engages with the miter-gear O and communicates the motion of the gear O to the miter power-transmitting gear Q, with which the gear T engages on its opposite side. The power-transmitting gear Q is attached to the power-transmitting shaft $n'$, which is journaled in the shaft H and tower-plate I.

Formed integrally with or attached to the lower end of the downwardly-projecting neck F is a horizontal arm, G, carrying the vertical gudgeon L, upon which is loosely mounted the double planet-gearing $x\, y$, the upper gear, $x$, engaging with the gear K, attached to the lower end of the shaft H, and the gear $y$ engaging with the gear Z, mounted stationarily in the tower upon the plate I.

The operation of the mechanism above described is as follows: When the turn-table is stationary, if the wind-wheel be rotated in its bearing in the direction indicated by the arrow on the gear $m$, the gear $m'$, shaft $n$, and gear O must turn in the direction indicated by the arrows on the gears $m'$ O. The turn-table being stationary, the arm G and gudgeon L are stationary, and the gears $x\, y$, journaled on the gudgeon L, are stationary. As the gear $y$ engages with the always-stationary gear Z and the gear K, engaging with the now-stationary gear $x$, is also stationary, the shaft H, arm N, and gudgeon P are also stationary; hence the rotation of the gear O rotates the gear T about the gudgeon P in the direction indicated by the arrow thereon, and this rotation of the gear T turns the power-transmitting gear Q in the direction indicated by the corresponding arrow thereon. The gear Q carries with it the shaft $n'$, and the shafts $n\, n'$ thus turn simultaneously in opposite directions. On the other hand, if the gear Q be held stationary, either by the resistance of the work or by any other means, and the turn-table be rotated in the direction indicated by the arrow thereon, the arm G and gudgeon L turn in the same direction and carry the double planet-gears $x\, y$ bodily in the same direction, and this bodily rotation of the gear $y$ will roll it about the equal stationary gear Z, with which it engages, and rotate it on its own axis L in the direction indicated by the arrow thereon. Now the gear $x$, being formed integrally with or attached to the gear $y$, must rotate with it about the gudgeon L. The gear K engages with the gear $x$, and is twice the diameter thereof, and as the gear $x$ is carried bodily once about the center of the gear K by the gudgeon L, and is also rotated once about the gudgeon L in the direction indicated by the arrow thereon through its connection with the gears y Z, the gear K will be rotated half of one revolution in the direction indicated by the arrow thereon—that is, if the gear x were rigidly attached to the gudgeon L, one rotation of the turn-table, arm G, and gudgeon L would carry the gear K around once in the same direction, since there could be no action between the gears x K; but though the gear x is carried once around bodily by the gudgeon L it is attached rigidly to the gear y, instead of to the gudgeon L, and hence is rotated once about the gudgeon L, together with the gear y, which is caused to roll about the stationary gear Z with each revolution of the gudgeon L, and the gear x, being half the size of the gear K, would thus rotate the gear K half a revolution in the opposite direction, or half-way back; but these two motions of the gear x bodily and about the gudgeon L taking place at the same time operate simultaneously on the gear K, and hence cause it to make only half a revolution for each revolution of the turn-table, arm G, and gudgeon L. The half of a revolution of the gear K is communicated through the shaft H to the arm N and gudgeon P, and thus revolves the planet-gear T about the shaft n', and since the power-transmitting gear Q is stationary the planet-gear T is thus rolled about the face of the gear Q, and turns the gear O and shaft n in the direction indicated by the arrow on the gear—that is, in the same direction as the rotation of the turn-table. As shown, the gears O T Q are miter-gears; consequently as one bodily rotation of the planet-gear T, together with one rotation on its axis, would produce two rotations of the gear O and shaft n, one-half of one bodily rotation of the gear T, arm N, shaft H, and gear K will produce one rotation of the gear O and shaft n. Hence the turn-table and shaft n maintain the same relative position, and the wind-wheel shaft does not turn in its bearing. In other words, the rotation of the turn-table does not turn either the working-shaft n' or the wind-wheel shaft E, and the mill can swivel without affecting or being affected by the work, and is therefore balanced.

Figure 1:
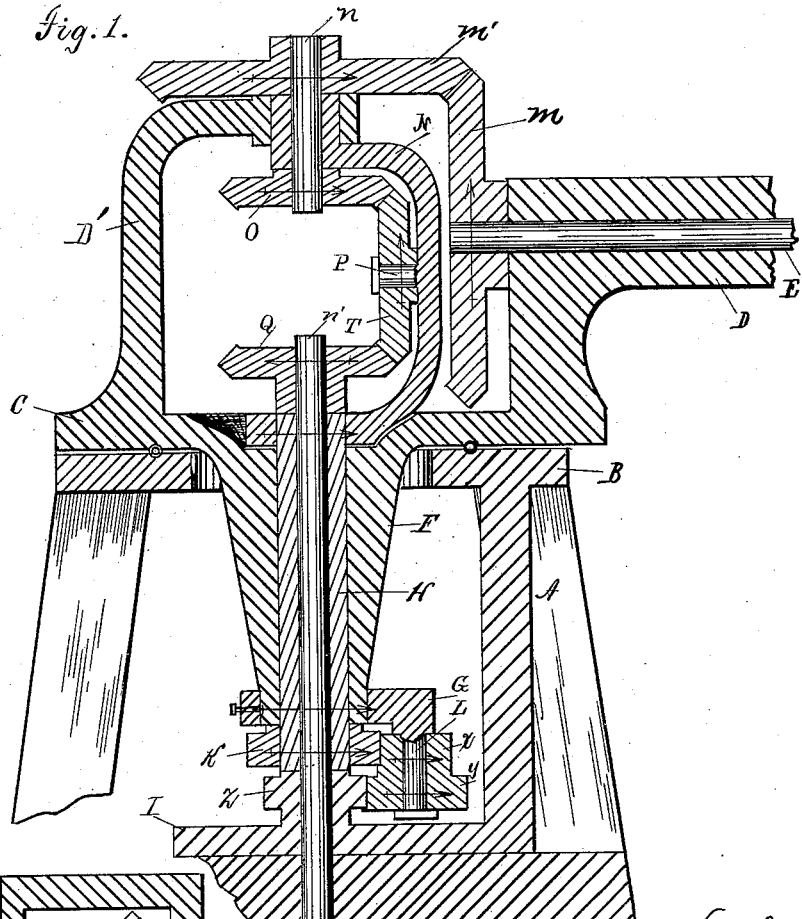
Figure 2:
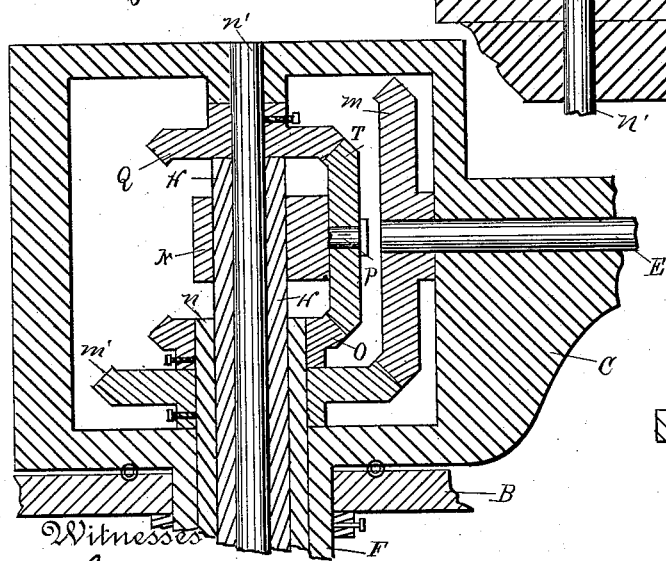
Fig. 2 shows a slightly-modified arrangement of the gearing m m' O T Q, located in the turn-table. The shaft n' and shaft H are continued upward, and the gears m' O and shaft n are journaled about the shaft H instead of in the arm D'.
Figure 3:
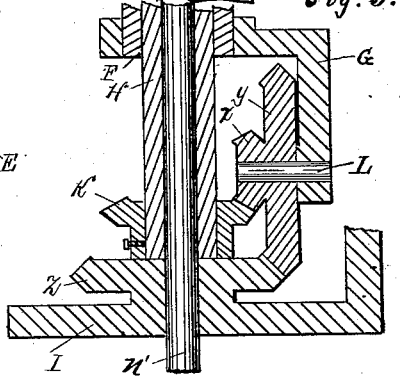
Fig. 3 shows a modified form of the lower part of the gearing—that is, the gears y Z are miter-gears, and the gears K x are beveled gears in the proportion of two to one. In this figure the gudgeon L is shown as fastened rigidly in the gear and rotating in its own support, and this construction may, if preferred, be used in the forms illustrated in the other figures.

In Fig. 4 a modified form of the invention, in which most of the gearing is located below the turn-table, is shown. The shaft H passes downward from the gear K, instead of upward, and the shaft n passes through the turn-table and shaft H to its gear O, which engages with the planet-gear T, and this transmits motion to the power-transmitting gear Q and shaft n', as before.

The gears O T Q may be spur and internal, instead of miter, which would necessitate simply a relative change in the proportion existing among the gears K x y Z.

Having now explained and described my invention, what I desire to secure by Letters Patent is—

1. In a gearing of the class described, the combination, with a plate adapted to be attached to the tower of a windmill, of a turn-table journaled in said plate, a wind-wheel shaft journaled in the turn-table, a planet-gear revolving with the turn-table and engaging with a gear fastened to the tower, a second planet-gear interposed between the wind-wheel shaft and the planet-gear revolving with the turn-table, gearing connecting the two planet-gears, and gearing connecting said second planet-gear with the wind-wheel shaft.

2. The combination, with the rotating turn-table of a windmill and a wind-wheel shaft journaled therein, of two independent vertical shafts, one of which is the power-transmitting shaft of the mill, gears connecting one of said vertical shafts directly with the wind-wheel shaft, a planet-gear interposed between said vertical shafts and connected therewith by suitable gears, a planet-gear revolving with the turn-table and engaging with a stationary gear fastened to the tower of the mill, and gears connecting said two planet-gears, substantially as and for the purpose set forth.

3. The combination, with the turn-table C, the wind-wheel shaft E, and the vertical shafts n n', of gears connecting the shafts E n, a third vertical shaft, H, and a planet-gear revolving therewith and interposed between the shafts n n', and a planet-gear revolving with the turn-table and engaging with two gears, one mounted on the shaft H and the other fastened to the tower of the windmill, or an attachment thereof.

4. The combination of the turn-table C, the planet-gear x y, revolving therewith and engaging a stationary gear, Z, the planet-gear T, the wind-wheel shaft E, journaled in the turn-table, gearing connecting the planet-gear T with the wind-wheel shaft, and gearing connecting the planet-gears T x y, substantially as and for the purpose set forth.

5. The combination of the turn-table C, wind-wheel shaft E, and shafts n n', the gears m m', connecting the shafts E n, the gears O Q, and planet-gear T, connecting the shafts n n', the planet-gear x y, revolving with the turn-table, the gear K, connecting the gear x with the support of the planet-gear T, and the gear Z, connecting the gear y with the tower of the windmill, substantially as and for the purpose set forth.

6. The combination, with the turn-table C, the wind-wheel shaft E, journaled therein, the stationary gear Z, and the planet-gear $x$ $y$, supported by the turn-table and engaging the stationary gear Z, of gearing, substantially as shown and described, connecting the planet-gear with the wind-wheel shaft.

7. The combination, in a windmill-gearing of the class described, of a rotating turn-table and the shafts E $n$ $n'$ H, and gears $m$ $m'$ O T Q, and planet-gear $x$ $y$, all supported by and revolving with the turn-table, substantially as and for the purpose set forth.

In testimony whereof I have signed this specification in the presence of two subscribing witnesses.

GEORGE H. PATTISON.

Witnesses:
JAMES H. STEARNS,
F. R. MEASE.